US006371767B1

(12) United States Patent
Libby

(10) Patent No.: US 6,371,767 B1
(45) Date of Patent: Apr. 16, 2002

(54) DEMONSTRATOR FOR NEW AUTOMOTIVE TECHNOLOGIES

(75) Inventor: Kenneth J. Libby, Waldenburg, MI (US)

(73) Assignee: The United States of America Government as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/776,867

(22) Filed: Feb. 5, 2001

(51) Int. Cl.[7] .............................................. G09B 25/00
(52) U.S. Cl. ...................................... 434/373; 296/205
(58) Field of Search ................................. 434/365, 373; 296/203.01, 204, 205; 446/470, 471; 180/208

(56) References Cited

U.S. PATENT DOCUMENTS

| | | | | |
|---|---|---|---|---|
| 4,163,578 A | * | 8/1979 | Watson | 296/204 |
| 4,660,345 A | * | 4/1987 | Browning | 52/648 |
| 4,798,400 A | * | 1/1989 | Kosuge | 280/796 |
| 5,090,934 A | * | 2/1992 | Quercetti | 446/93 |
| 5,094,313 A | * | 3/1992 | Mauws | 180/210 |
| 5,720,511 A | * | 2/1998 | Benedyk | 296/203 |

* cited by examiner

*Primary Examiner*—Kien T. Nguyen
(74) *Attorney, Agent, or Firm*—David L. Kuhn; Clifford Carter; Gail S. Soderling

(57) ABSTRACT

A demonstrator for mounting, operating and displaying a multiplicity of automotive vehicle components comprises an open-frame exoskeleton of aluminum tubes. The tubes are in a configuration suggestive of the shape of an automotive vehicle. The demonstrator is light in weight, is easily shipped and is movable by a single person. A central compartment of the exoskeleton resembles a passenger compartment and has doorways similar in height and width to door openings of the vehicle. A front compartment of the demonstrator resembles a vehicle engine compartment, this compartment defining a generally horizontal window free of other structure of the demonstrator. The front compartment includes front wheel-well outlines defined by tube segments welded together. A rear compartment of the demonstrator similarly defines rear wheel-well outlines. One or more pathways for cables, wires or fluid lines pass through the hollow tubes of the demonstrator, each pathway having one or more passageways through intersections of the hollow tubes. The central compartment is mounted on a wheeled dolly that can be steered having one axle that tilts relative to the other, whereby the demonstrator is supported by all four wheels when on uneven ground.

3 Claims, 3 Drawing Sheets

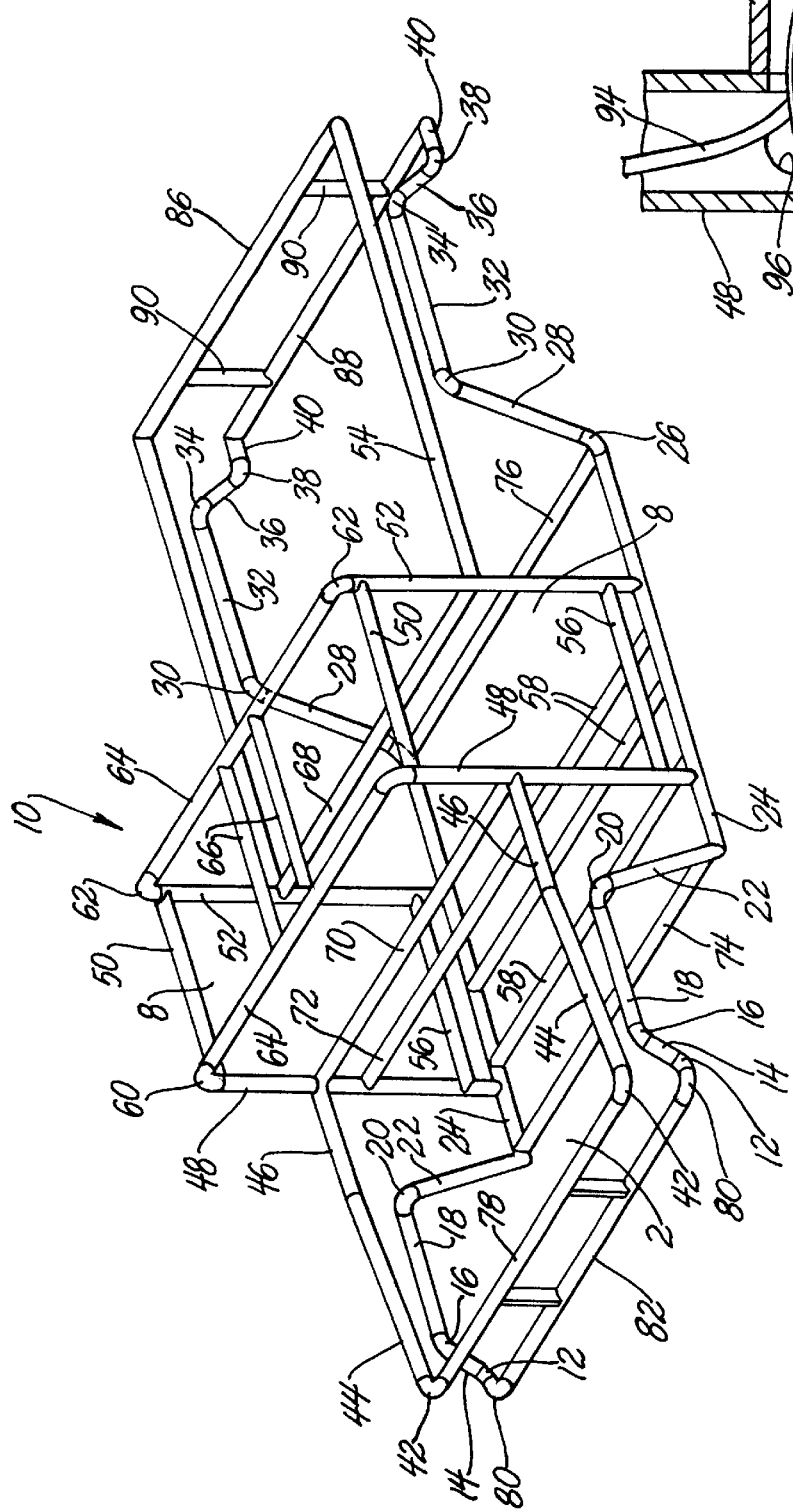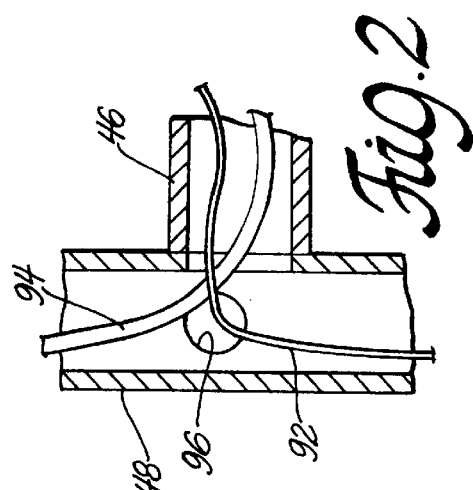

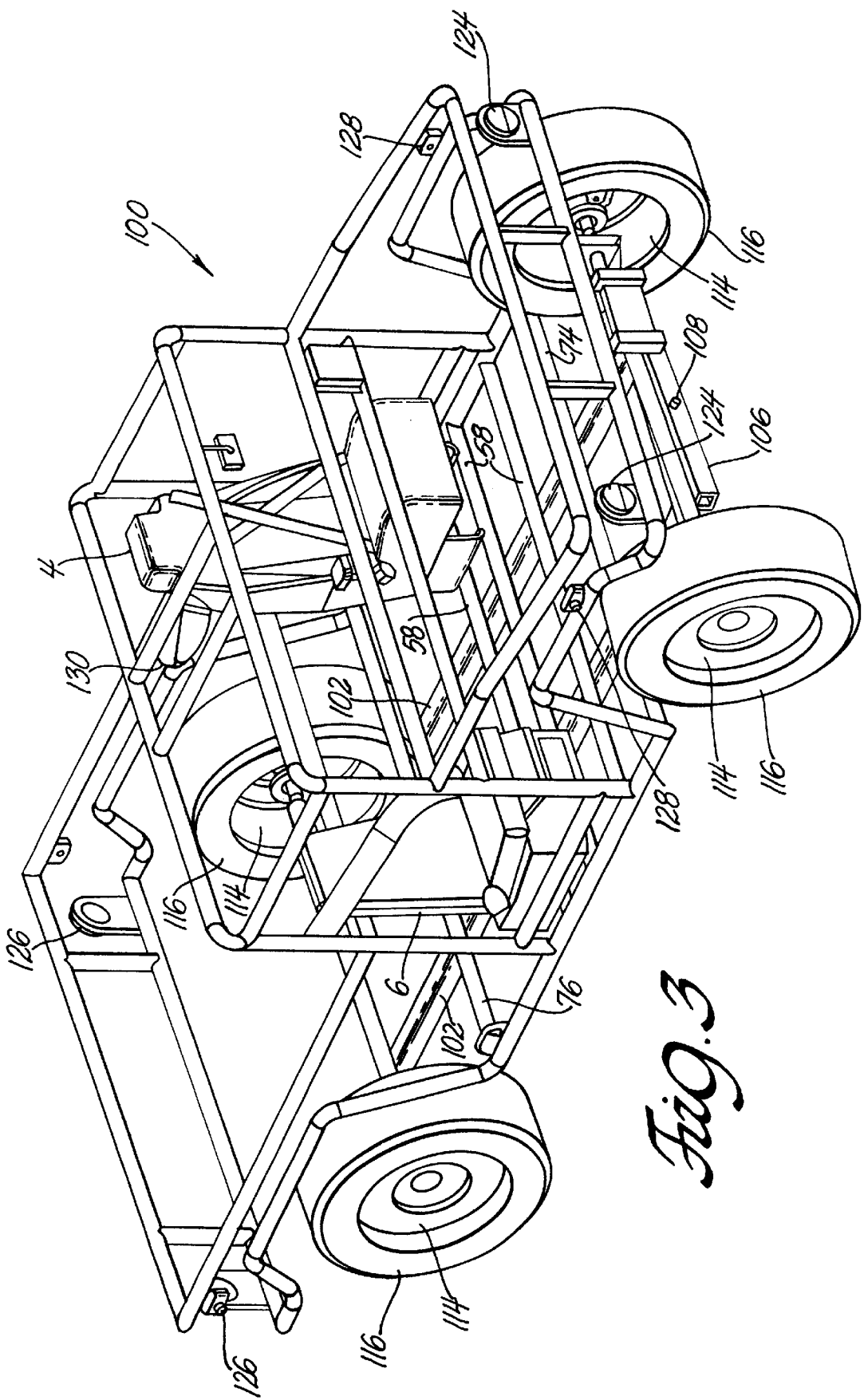

DEMONSTRATOR FOR NEW AUTOMOTIVE TECHNOLOGIES

GOVERNMENT USE

The invention described here may be made, used and licensed by the or for the U.S. Government for governmental purposes without paying me any royalty.

SUMMARY AND BACKGROUND

Military vehicles tend to have much longer service life than commercial vehicles or private vehicles, the service life of a military vehicle normally being a number of decades. During their life, military vehicles have numerous replacements of aging systems or components with items having newer technology. Occasionally, too, vehicles have special components retrofitted thereto so that the vehicle can accomplish a new mission. To test and demonstrate new or proposed systems and components, they are installed on vehicles from the military service's active fleet. These vehicles may be shipped to laboratories or proving grounds for testing, and they may shipped to trade shows or to special demonstrations for key US Government officials.

The use of vehicles from the active fleet for this purpose has disadvantages. First, it reduces the number of units available to active military units. Second, installing new components or systems in existing vehicles consumes numerous man-hours, especially if components or systems must be removed and replaced after the test or demonstration. Third, the processes of preparing vehicles for shipping and shipping them are costly. Finally, the components to be demonstrated often can not be seen easily unless other parts of the vehicle are removed.

To address the foregoing problems, I have invented a demonstrator for displaying and testing new or experimental vehicle components. The demonstrator holds a multiplicity of such components, which can be easily added or removed. The structure is an open-frame exoskeleton having the overall shape of an extant military vehicle. The exoskeleton is made of aluminum tubes to which the components are welded, bolted or fastened by other known means. The open-frame nature of the construction allows convenient access to the components and permits them to be viewed easily from almost any direction. At the same time, the demonstrator reminds observers of a particular vehicle and shows the juxtapositions of components with each other and the vehicle. Further, the demonstrator is lighter than the vehicle it emulates and is thus cheaper and easier to ship.

BRIEF DESCRIPTION OF THE DRAWINGS

FIG. 1 is a left front perspective view of a first embodiment of the demonstrator.

FIG. 2 is a sectioned detail view showing a cable and a fluid conduit passing through an intersection of tubes of the demonstrator.

FIG. 3 is a right front perspective view of a second embodiment of the demonstrator, there being automobile components installed thereon.

DETAILED DESCRIPTION

Figure 4:
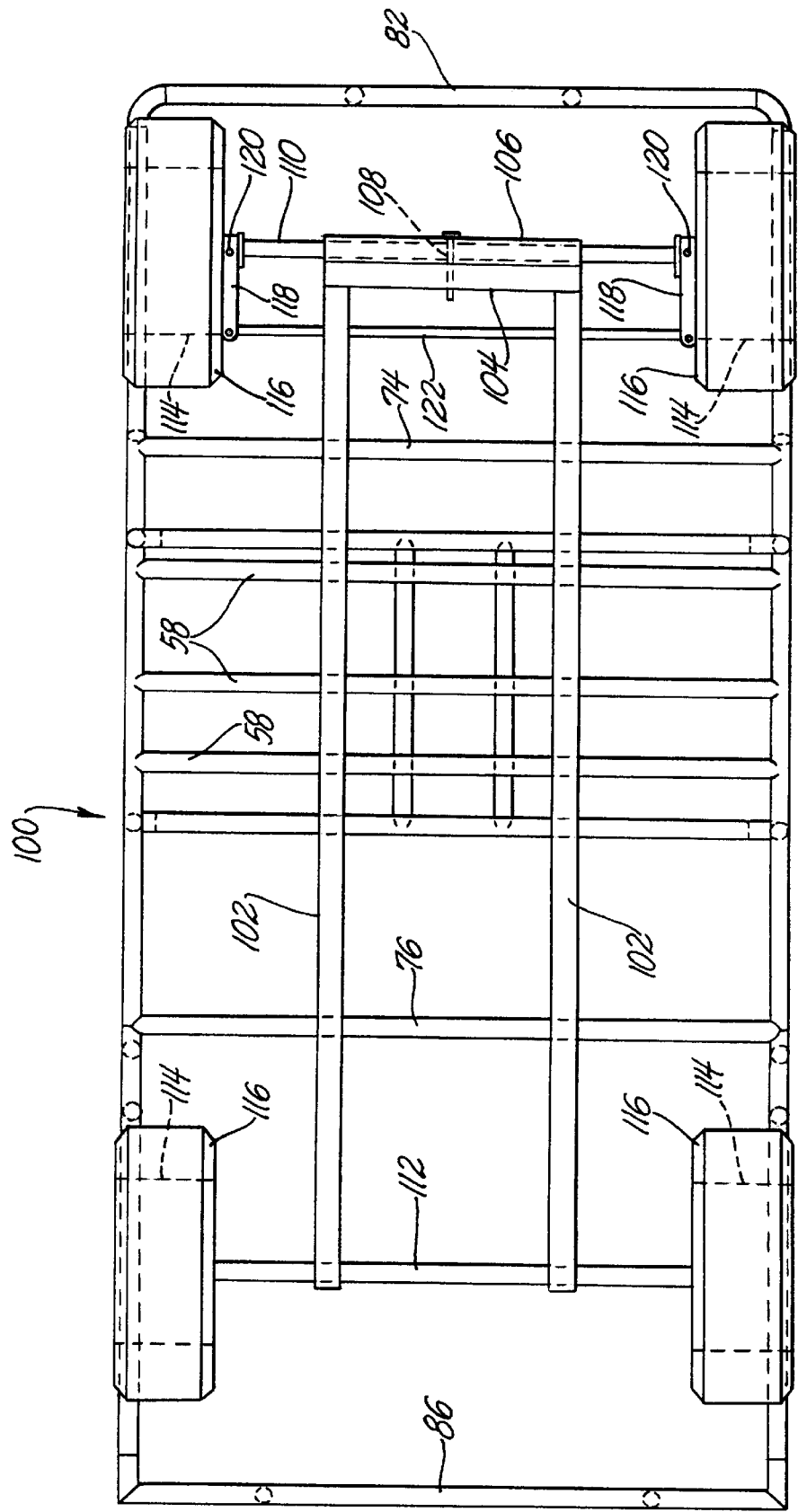
FIG. 4 is a bottom perspective view of the second embodiment of the demonstrator.

FIG. 1 shows the automotive technology demonstrator 10 having a general configuration suggestive of the body shape of a version of the US Army's HMMWV, or High Mobility Multi-Purpose Wheeled Vehicle. The body shape could alternately be that of a light truck or other automotive land vehicle. Demonstrator 10 is an open-frame exoskeleton comprised of aluminum tubes welded together. Tubes 12, 14, 16, 18, 20, 22, 24, 26, 28, 30, 32, 34, 36, 38 and 40 form an outline resembling the bottom edge of a HMMWV's body. Tubes 12 through 22 simulate a front wheel well of the body and tubes 26 through 38 simulate a rear wheel well. The tubes at reference numerals 12, 16, 20, 26, 30, 34 and 38 are curved, corresponding to rounded corners of the wheel wells. Curved tube 42, tube 44, tube 46, the upper portion of pillar 48, tubular lintel 50, the upper portion of pillar 52 and tube 54 form an outline resembling the top edge of a HMMWV's body. The entire set of the aforementioned tubes forms a side-view outline that resembles the silhouette of a HMMWV.

Demonstrator 10 may be regarded as having three compartments, including a central, passenger compartment, a forward, engine compartment and a rear, cargo compartment. The passenger compartment is bordered at its vertical corners by forward pillars 48 and aft pillars 52. The passenger compartment also has lateral rectangular openings 8 defined by lintels 50, tubular door sill 56 and the portions of pillars 48 and 52 between the lintels and sills. Opening 8 has vertical and horizontal dimensions which are the same as, or very close to, the dimensions of the door ways of the HMMWV's passenger compartment, so that the conditions of entering or exiting a HMMWV may be simulated.

At the bottom of the passenger compartment are tubular floor members 58 connecting portions of tubes 24 between pillars 48 and 52. These members can mount a driver seat assembly 4 and a passenger seat assembly 6 (FIG. 3). The seat assemblies and any switches, gauges, levers or display screens can be mounted in demonstrator 10 in the same relation to seat 6, and a person sitting therein, as in an actual HMMWV. Tubular floor members 58, along with forward lower cross member 74 and aft lower cross member 76, are in the same general horizontal plane and provide attachment points for a chassis. Alternatively, they provide rest points by which demonstrator 10 can be set upon a flat bed cart or a similar conveyance.

At the top of the passenger compartment are roof members 64 joined to tubes 48 and 52 by elbows 60 and 62, respectively. The midsections of roof members 64 are connected by roof cap members 66. Disposed between pillars 48 at the front of the passenger compartment are two dash members 70 and 72, so called because they are located at the same place where the dashboard is in a HMMWV. Tube 68 is connected between pillars 52 at the rear of the passenger compartment. The passenger compartment has the same internal dimensions as found in the HMMWV.

The forward, engine compartment of demonstrator 10 is outlined at the top, or hood area, by upper dash tube 70, tubes 46, tubes 44, curved tubes 42 and 44 and an upper frontal tube 78. Preferably, these tubes form a generally horizontal window 2 free of structure within the window's opening. The lower portion of the engine compartment is outlined by the portions of tubes 24 forward of pillars 48, tubes 22, arcuate tubes 20, tubes 18, arcuate tubes 16, tubes 14, arcuate tubes 12, arcuate tubes 80 and a lower frontal tube 82. The lower portion of the engine compartment also includes forward cross member 74 connecting the rear edges of wheel well outlines defined by tubes 12 through 22. No tubes cross the space bordered by forward cross member 74, the aforementioned wheel well outlines and lower frontal tube 82. Consequently, the engine compartment is open top to bottom such that a workman can stand in the engine compartment while installing a component onto demonstrator 10. Two vertical tubes 84 connect the central portions of frontal tubes 78 and 82 but, preferably, the front corners of demonstrator 10 are free of vertical tubes such as those at 84.

The rear, cargo compartment of demonstrator 10 has an open, upper widow portion bordered by tube 68, tubes 54, and upper posterior cross member 86. The cargo compartment has an open, lower window portion bordered by aft cross member 76, tubes 26 through 40 and lower posterior cross member 88. Two vertical tubes 90 connect the posterior cross members. These vertical tubes are disposed somewhat inboard from tubes 54 and 40, so as to leave the rear corners of demonstrator 10 free of structure between the upper and lower portions of the cargo compartment.

The individual tubes and elbows from which demonstrator 10 is fashioned are typically two-inch diameter aluminum tubes. Intersections between the tubes are essentially tee pipe intersections, in that the interiors of intersecting tubes communicate, as illustrated in FIG. 2. There, by way of example, tube 46 is shown intersecting with tube 48, there being an optical or electrical cable 92 passing through the intersection. A hydraulic or pneumatic line 94 is also shown passing through the intersection. Holes, as at 96, can be drilled at the intersection or at other points in the tubes of demonstrator 10 to provide ingress and egress points for the cables and lines. It is contemplated that cables and lines will be routed along predetermined pathways inside the tubes of demonstrator 10 once the automotive components to be mounted on the demonstrator are chosen. In order to keep the intersections free of encumbrances, it is preferred that connections of tubes be done by welding as opposed to bolts or like fasteners.

FIGS. 3 and 4 show a second embodiment 100 of the demonstrator having preferred additional structure in the form of an elongate dolly. The dolly has two longitudinal square-tube frame members 102 welded beneath floor members 58, forward cross member 74 and aft cross member 76. As more easily seen in FIG. 4, a transverse square tube member 104 is welded between the forward ends of frame members 102. A second transverse tube member 106 is not fixed to the longitudinal frame members but instead is pivoted to transverse tube member 104 by a pin 108. The second transverse tube member tilts in a vertical plane parallel to the first transverse tube member. A forward axle 110 is directly and rotatably attached to tube member 108 and an aft axle 112 is similarly attached to the aft ends of frame members 102. Rotatable wheels 114 are attached to axles 110 and 112, and these wheels typically have run-flat tires 116 mounted thereon.

The front wheels can pivot with axle 110 about pin 108, whereby demonstrator 100 can be set on uneven ground and still rest on all four wheels. The front wheels also pivot with arms 118 about joint pins 120, the arms being linked by tie rod 122, so that the front wheels turn right or left together relative to the demonstrator. Arms 18 and rod 122 tilt with axle 110. The arms and rod enable the demonstrator to be steered by a person turning either front wheel right or left. Even with the run flat tires, demonstrator 100 is light enough for a single person to steer and push it to a desired location.

FIG. 3 shows examples of components that may be placed on demonstrator 100. These include headlights 124, tail lights 126, side marker lights 128, driver's seat assembly 4, passenger seat assembly 6 and electronic instrument 130. It is contemplated that the aforementioned lights will be welded to demonstrator 100 but bolts, clamps or other conventional fastening mechanisms can be used for the lights and for any other components as well.

I do not desire to be limited to the exact details of construction or method shown herein since obvious modifications will occur to those skilled in the relevant arts without departing from the spirit and scope of the following claims.

What is claimed is:

1. A light weight, easily transportable demonstrator for mounting, operating and displaying a multiplicity of automotive vehicle components wherein the relative positions of the components in the demonstrator are similar to their relative positions in an automotive vehicle for which the components are designed, the demonstrator comprising:

an open-frame exoskeleton suggestive of the shape of the automotive vehicle, the exoskeleton fabricated from hollow tubes;

a central compartment of the exoskeleton;

a doorway of the central compartment defined by a sill tube, a lintel tube and two upright tubes connected to the sill and lintel tubes, the doorway having a height and a width configured to be the same as a height and a width of a door opening on the automotive vehicle;

floor tubes of the central compartment at the bottom of thereof, the floor tubes defining a base upon which the demonstrator rests;

a front compartment of the demonstrator integral with the central compartment;

upper tubes of the front compartment framing an upper generally horizontal window opening free of other structure of the demonstrator;

lower tubes of the front compartment surrounding a space below the upper window opening, the space being free of the other structure of the demonstrator;

front wheel well outlines defined by the lower tubes of the front compartment;

front corners of the demonstrator defined by the upper and lower tubes of the front compartment, there being a gap at the front corners between the upper and lower tubes of the front compartment;

a rear compartment of the demonstrator integral with the central compartment;

rear wheel well outlines defined by the rear compartment; and one or more pathways through the hollow tubes of the demonstrator, each pathway having one or more passageways through intersections of the hollow tubes.

2. A mobile demonstrator for mounting, operating and displaying a multiplicity of automotive vehicle components wherein the relative positions of the components in the demonstrator are similar to their relative positions in an automotive vehicle for which the components are designed, the demonstrator comprising:

an open-frame exoskeleton suggestive of the shape of the automotive vehicle, the exoskeleton fabricated from hollow tubes;

a central compartment of the exoskeleton;

a doorway of the central compartment defined by a sill tube, a lintel tube and two upright tubes connected to the sill and lintel tubes, the doorway having a height and a width configured to be the same as a height and a width of a door opening on the automotive vehicle;

floor tubes of the central compartment at the bottom of thereof;

a front compartment of the demonstrator integral with the central compartment;

upper tubes of the front compartment framing an upper generally horizontal window opening free of other structure of the demonstrator;

lower tubes of the front compartment surrounding a space below the upper window opening;

front wheel well outlines defined by the lower tubes of the front compartment;

front corners of the demonstrator defined by the upper and lower tubes of the front compartment, there being a gap at the front corners between the upper and lower tubes of the front compartment;

a rear compartment of the demonstrator integral with the central compartment;

rear wheel well outlines defined by the rear compartment;

one or more pathways through the hollow tubes of the demonstrator, each pathway having one or more passageways through intersections of the hollow tubes;

a dolly of the demonstrator on which is fixed the central compartment;

longitudinal frame members of the dolly fixed to the floor tubes;

a first forward transverse frame member fixed at forward ends of the longitudinal frame members;

a second forward transverse frame member mounted to the first forward transverse frame member, the second forward transverse frame member tiltable relative to the first transverse frame member;

a rear axle mounted directly and rotatably to the longitudinal frame members;

a front axle mounted directly and rotatably to the second forward transverse frame member;

a set of rear wheels on the rear axle;

a set of front wheels on the front axle; and means on one of the sets of wheels to permit turning of wheels in the set right or left relative to the demonstrator.

3. The demonstrator of claim 2 wherein the means to permit turning is connected to the front set of wheels and tilts with the front set of wheels relative to the first transverse frame member.

* * * * *